Patented Feb. 6, 1951

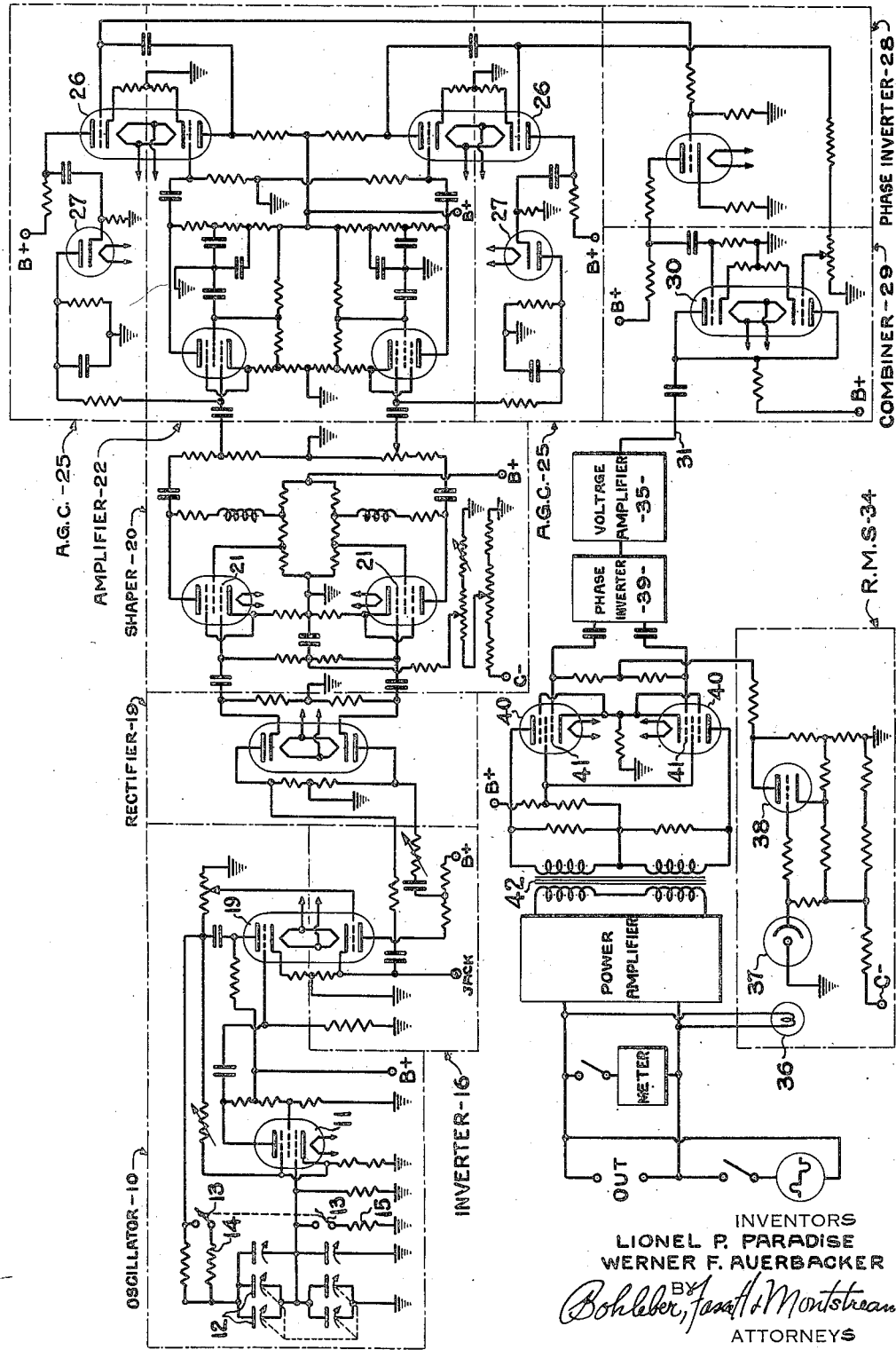

2,540,213

UNITED STATES PATENT OFFICE 2,540,213

REGULATED ALTERNATING CURRENT POWER SUPPLY

Lionel P. Paradise, New York, and Werner F. Auerbacher, Brooklyn, N. Y., assignors to Radio-Television Institute, Inc., New York, N. Y., a corporation of New York Application April 3, 1946, Serial No. 659,206

13 Claims. (Cl. 250—27)

1

The invention relates to an A. C. power supply which will generate a voltage wave of desired frequency over a relatively wide range of frequencies, for example 50–3000 cycles and the form or shape of which wave may be varied as desired. There are many devices including pieces of equipment and instruments, such as used on aeroplanes, which are connected with various power supply means having different frequencies and form of voltage waves depending upon the generator supplied. The wave forms delivered by the respective generators may be sinusoidal, peaked or flat and when peaked or flat may differ widely in their wave form. The testing of these devices requires that they be energized from a source of A. C. supply which corresponds with that delivered by the generator carried by the aeroplane to supply the respective devices when in actual use. The power supply to be described herein is designed to furnish a wave of a desired frequency and of a wave form corresponding with that of the generator which will supply the equipment or instruments with electrical energy when in use.

It is an object of the invention to construct an A. C. power supply which may be adjusted to generate a frequency over a wide frequency range and in which the wave form may be varied in order to duplicate the wave form of the generator which will supply the device when in actual use.

Another object of the invention is to construct an A. C. power supply which may be adjusted to generate a frequency over a wide range in which the wave form is modified or shaped to that desired by rectifying the positive and negative half waves and shaping each half wave to the desired shape. The shaped half waves are then combined to produce a full wave of the desired wave form.

A still further object is to construct an A. C. power supply which will provide any frequency over a relatively wide frequency range and the wave form of which may be shaped to that desired and in which an R. M. S. control is provided whereby the R. M. S. output is maintained substantially constant. The R. M. S. control particularly shown is one which utilizes an incandescent lamp and balances out undesired peaks and the undesired voltage variations introduced by the incandescent lamp.

Other objects of the invention will be clear from the following description taken in connection with the drawing which illustrates a preferred circuit in which the figure is a diagram illustrating the circuit with some parts shown in block form.

The power supply utilizes a voltage generator such as an oscillator 10 which generates a sine wave. Any form of generator or oscillator is contemplated, that illustrated utilizing a vacuum tube 11 with a condenser resistance input. Variable condensers 12 vary the frequency generated to that desired such as over a range of 50–400 cycles and switching means 13 may be used to connect resistor 14 and resistor 15 into the resistor capacitor network to generate frequencies from 400–3000 cycles. The output of the oscillator is fed to an inverter 16 which balances the output signals.

The output of the inverter supplies the signal to two circuit channels, each channel having a rectifier 19 to pass a half wave to each channel. Each rectifier is connected with a shaper 20 which may be a pentode having a control grid 21. The bias on the control grid may be adjusted to vary the shape of its respective half wave. For example if the control grid is provided with a large negative bias the voltage wave is peaked and each peak will be less than 180° so that the ultimate shape of the full wave formed by combining the half waves will be a peaked wave, the shape of the wave being determined by the amount of negative bias applied to the control grids. Similarly if no bias or a low value of negative bias is applied to the control grids the shape of each half wave will be broad and flat and the combined wave formed from the half waves will be similarly shaped. By fixing the proper bias upon the control grid a wide range of wave shapes may be produced.

Means are provided, therefore, to vary the negative bias upon the control grid which may be of any suitable form, the means particularly illustrated being variable resistors. Preferably the means for varying the negative bias upon the control grid is a single means controlling each shaper 20. The output of the shaper is connected with an amplifier 22 of any suitable number of stages, two being shown.

The amplifier 22 may be provided with an automatic gain control 25 (AGC) which may include an amplifier 26 connected with a rectifier 27 which feeds back a D. C. component to the input of the amplifier 22. One of the channels is provided with a phase inverter 23 which reverses the phase of the half wave in that channel to its negative equivalent. The output of each channel is fed to a combiner 29 such as a pair of triodes having a common output circuit 31 so that the two half waves are combined into a full wave of the desired shape and frequency.

The combiner is connected with a voltage amplifying means 35 which may include one or more stages of amplification. The amplifying means is connected to a phase inverter 39 when an RMS control is utilized to control the output of the circuit. It is desirable that an A. C. power supply, such as that described, be provided with an RMS control 34. The output of the power amplifier or a portion thereof may be used to light an incandescent lamp 36 which is connected across the output of the amplifier, the brilliancy of which lamp depends upon the RMS output. The light from the incandescent lamp is directed upon a phototube 37 which picks up the light variations of the incandescent lamp. The D. C. signal from the phototube is amplified in an amplifier 38 and fed back to the input of the voltage amplifying means. The power amplifier therefore maintains a constant or substantially constant RMS output.

The anode of the phototube 37 is connected to ground potential and the cathode is connected to a direct current source C of minus potential. The plate or anode of the amplifier tube 38 is also connected to ground potential through any suitable loading means, that shown being resistors. The cathode is connected with a direct current source C of minus or negative potential with respect to ground. Any suitable connection with the direct current source may be used such as that shown using dropping resistors. The plate of the amplifier is connected with the control grids 41 of the balanced amplifiers 40 whereby RMS control of the negative bias thereupon is accomplished through illumination of the cathode of the phototube 37 by the incandescent lamp 36.

An incandescent light 36 does not distinguish in its illumination between positive and negative portions of a voltage wave and its illumination does vary somewhat with the voltage wave. Also upon changes in load, the lamp may transmit an undesired peak to the input of the amplifier. Such variations may be balanced out by connecting the phase inverter 39 to a pair of vacuum tubes 40 to balance the wave fed to each tube. The output of the RMS control circuit is connected with the control grids 41 of the pair of tubes whereby any undesired voltage variations in the RMS control circuit are balanced out in the windings of the transformer 42 connected in the output circuit of the tubes. The D. C. component from the RMS control circuit maintains the control grids of the tubes at the desired bias voltage so that the RMS output from the power amplifier remains constant or substantially so.

Instruments may be supplied to indicate the current and voltage output of the A. C. power supply and an oscilloscope will show the shape of the wave being produced.

The invention is presented to fill a need for improvements in a regulated A. C. power supply. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A regulated power supply comprising an oscillator having means to vary the frequency of oscillations generated over a relatively wide range, means connected with the output of the oscillator to rectify the wave and shape each of the half waves to the desired wave form including vacuum tube means each having an anode, control grid and cathode, means to vary the bias upon each control grid and thereby control the shape of each wave, power amplifying means connected with the wave shaping means, a phase inverter connected with one power amplifying means, and a pair of balanced vacuum tubes each having a control grid connected to the phase inverter to swing the control grids in opposite directions, and a transformer connected with the output of the tubes; and a RMP feed back control for the amplifying means including an incandescent lamp connected with the output of the power amplifying means, a phototube illuminated by the lamp, and a connection from the phototube to the input of the balanced vacuum tubes to swing the control grids thereof in the same direction.

2. A regulated power supply comprising an oscillator having means to vary the frequency of oscillations generated over a wide range; a pair of circuit channels connected with the oscillator each channel including a rectifying means whereby one half wave is transmitted to one channel and the other half wave is transmitted to the other channel, a wave shaper connected with each rectifying means including a vacuum tube means having an anode, control grid and cathode, means to vary the bias upon the control grids and thereby control the shape of each half wave, and a phase inverter in one of said channels connected with the wave shaper; and means connected with the output of each channel to recombine the two half waves into a full wave of the desired wave form.

3. A regulated power supply comprising an oscillator having means to vary the frequency of oscillations generated, over a relatively wide range, a phase inverter connected with the oscillator for balanced output; a pair of circuit channels connected with the phase inverter, each channel including a rectifying means whereby one half wave is transmitted to one channel and the other half wave to the other channel, a wave shaper connected with the rectifying means including a vacuum tube means having an anode, control grid and cathode, means to vary the bias upon the control grids and thereby control the shape of each half wave, and a phase inverter in one of said channels connected with the wave shaper; and a combining means connected with the output of each channel to recombine the two half waves into a full wave of the desired wave form.

4. A regulated power supply comprising an oscillator having means to vary the frequency of oscillations generated over a relatively wide range; a pair of circuit channels connected with the oscillator, each channel including rectifying means whereby one half wave is transmitted to one channel and the other half wave to the other channel, a wave shaper connected with the rectifying means including a vacuum tube means having an anode, control grid and cathode, means to vary the bias upon the control grids and thereby control the shape of each half wave, amplifying means connected with each wave shaper, an automatic gain control for each amplifying means, and a phase inverter in one of said channels connected with the amplifying means; and a combining means connected with the output of each channel to recombine the two half waves into a full wave of desired wave form.

5. A regulated power supply comprising an oscillator having means to vary the frequency of oscillations generated over a relatively wide range; a pair of circuit channels connected with the oscillator, each channel including rectifying means whereby one half wave is transmitted to one channel and the other half wave to the other channel, a wave shaper connected with the rectifying means including a vacuum tube means having an anode, control grid and cathode, means common to both wave shapers to vary the bias upon the control grids and thereby control the shape of each half wave, amplifying means connected with each wave shaper, an automatic gain control for each amplifying means, and a phase inverter in one of said channels connected with the amplifying means; and a combining means connected with the output of each channel to recombine the two half waves into a full wave of a desired wave form.

6. A regulated power supply comprising an oscillator having means to vary the frequency of oscillations generated over a relatively wide range; a pair of circuit channels connected with the oscillator each including a rectifying means whereby one half wave is transmitted to one channel and the other half wave to the other channel, a wave shaper connected with the rectifying means including a vacuum tube means having an anode, control grid and cathode, means to vary the bias upon the control grids and thereby control the shape of each half wave in each channel and a phase inverter in one of said channels; a combining means connected with the output of each channel to recombine the two half waves into a full wave of the desired wave form, power amplifying means connected with the combining means, and an RMS feed back control for the amplifying means connected with the output thereof including an incandescent lamp connected with the output of the amplifying means, a phototube illuminated by the lamp, and a connection from the phototube to the input of the power amplifying means.

7. A regulated power supply comprising an oscillator having means to vary the frequency of oscillations generated over a relatively wide range, inverter means connected with the output of the oscillator to balance the output signals; a pair of circuit channels connected with the inverter means, each channel including a rectifying means whereby one half wave is transmitted to one chanel and the other half wave to the other channel, a wave shaper connected with the rectifying means including a vacuum tube means having an anode, control grid and cathode, means to vary the bias upon the control grids and thereby control the shape of each half wave in each channel, amplifying means connected with each wave shaper, an automatic gain control for each amplifying means, and a phase inverter in one of said channels connected with the amplifying means in that channel; and a combining means connected with the output of each channel to recombine the two half waves into a full wave of a desired wave form.

8. A regulated power supply comprising an oscillator having means to vary the frequency of oscillations generated; a pair of circuit channels connected with the oscillator each channel including a rectifying means whereby one half wave is transmitted to one channel and the other half wave to the other channel, a wave shaper connected with the rectifying means including a vacuum tube means having an anode, control grid and cathode, means to vary the bias upon the control grids and thereby control the shape of each half wave, amplifying means connected with each wave shaper, an automatic gain control for each amplifying means, and a phase inverter in one of said channels connected with the amplifying means; a combining means connected with the output of each channel to recombine the two half waves into a full wave of a desired wave form, power amplifying means connected with the combining means, and an RMS feed back control for the amplifying means including an incandescent lamp connected with the output of the power amplifying means, a phototube illuminated by the lamp, and a connection from the phototube to the input of the power amplifying means.

9. A regulated power supply comprising an oscillator having means to vary the frequency of oscillations generated over a relatively wide range, inverter means connected with the output of the oscillator to balance the output signals; a pair of circuit channels connected with the inverter means, each channel including rectifying means whereby one half wave is transmited to one channel and the other half wave to the other channel, a wave shaper connected with the rectifying means including a vacuum tube means having an anode, control grid and cathode, means to vary the bias upon the control grid of each wave shaper and thereby control the shape of each half wave in each channel, amplifying means connected with each wave shaper, an automatic gain control for each amplifying means, and a phase inverter in one of said channels connected with the amplifying means in that channel; a combining means connected with the output of each chanel to recombine the two half waves into a full wave of a desired wave form, power amplifying means connected with the combining means, and an RMS feed back control for the amplifying means including an incandescent lamp connected with the output of the power amplifying means, a phototube illuminated by the lamp, and a connection from the phototube to the input of the power amplifying means.

10. A regulated power supply comprising an oscillator having means to vary the frequency of oscillations generated over a relatively wide range, inverter means connected with the output of the oscillator to balance the output signals; a pair of circuit channels connected with the inverter means, each channel including rectifying means whereby one half wave is transmitted to one channel and the other half wave to the other channel, a wave shaper connected with the rectifying means including a vacuum tube means having an anode, control grid and cathode, means to vary the bias upon the control grid of each wave shaper and thereby control the shape of each half wave in each channel, amplifying means connected with each wave shaper, an automatic gain control for each amplifying means, and a phase inverter in one of said channels connected with the amplifying means in that channel; a combining means connected with the output of each channel to recombine the two half waves into a full wave of a desired wave form, power amplifying means connected with the combining means including a pair of balanced vacuum tubes each having a control grid connected with the combining means to swing the control grids in opposite directions; and an RMS feed back control for the power amplifying means including an incandescent lamp connected with the output of the power amplifying means, a phototube illuminated by the lamp, and a connection from the phototube to the control grids of the balanced vacuum tubes to swing the control grids thereof in the same direction.

11. A regulated power supply comprising an oscillator having means to vary the frequency of oscillations generated over a relatively wide range, means connected with the output of the oscillator to rectify the wave and shape the half waves to the desired wave form, means to control the shape of the half waves, means to combine the half waves, power amplifying means connected with the combining means including a phase inverter, and a pair of balanced vacuum tubes each having a control grid connected to the phase inverter to swing the control grids in opposite directions, and a transformer connected with the output of the tubes; and an RMS feedback control for the amplifying means including an incandescent lamp connected with the output of the power amplifying means, a phototube illuminated by the lamp having its anode connected at ground potential and its cathode at a negative potential, and a connection from the phototube to the input of the balanced vacuum tubes to swing the control grids thereof in the same direction.

12. A regulated power supply comprising an oscillator having means to vary the frequency of oscillations generated over a relatively wide range, means connected with the output of the oscillator to rectify the wave and shape the half waves to the desired wave form, means to control the shape of the half waves, means to combine the half waves, power amplifying means connected with the combining means including a phase inverter, and a pair of balanced vacuum tubes each having a control grid connected to the phase inverter to swing the control grids in opposite directions, and a transformer connected with the output of the tubes; and an RMS feed back control for the amplifying means including an incandescent lamp connected with the output of the power amplifying means, a phototube illuminated by the lamp, having its anode connected at ground potential and its cathode at a negative potential, an amplifier connected with the phototube having an anode connected with ground potential and its cathode at a negative potential, and a connection from the amplifier to the input of the balanced vacuum tubes to swing the control grids thereof in the same direction.

13. A regulated power supply comprising an oscillator having means to vary the frequency of oscillations generated over a wide range; a pair of circuit channels connected with the oscillator each channel including a rectifying means whereby one half wave is transmitted to one channel and the other half wave is transmitted to the other channel, a wave shaper connected with each rectifying means, means to control the shape of each half wave, and a phase inverter in one of said channels connected with the wave shaper; and means connected with the output of each channel to recombine the two half waves into a full wave of the desired wave form.

LIONEL P. PARADISE.
WERNER F. AUERBACHER.

REFERENCES CITED

The following references are of record in the file of this patent:

UNITED STATES PATENTS

| Number | Name | Date |
| --- | --- | --- |
| 1,843,288 | Leonard | Feb. 2, 1932 |
| 2,103,619 | Hallmark | Dec. 28, 1937 |
| 2,230,926 | Bingley | Feb. 4, 1941 |
| 2,379,513 | Fisher | July 3, 1945 |
| 2,408,079 | Labin | Sept. 24, 1946 |